United States Patent [19]

Wikdahl

[11] 3,774,761

[45] Nov. 27, 1973

[54] PROCESS AND APPARATUS FOR FILTERING CELLULOSE FIBER SUSPENSIONS

[76] Inventor: Anders Lennart Wikdahl, 42 Bravallavagen, Djursholm, Sweden

[22] Filed: Mar. 2, 1971

[21] Appl. No.: 120,228

[52] U.S. Cl. .................... 210/81, 210/414, 209/283
[51] Int. Cl. ............................................ B01d 29/38
[58] Field of Search .................... 210/81, 332, 340, 210/413–415, 405, 433; 209/273, 283

[56] References Cited
UNITED STATES PATENTS

| | | | |
|---|---|---|---|
| 3,232,436 | 2/1966 | Nilsson | 210/414 X |
| 3,394,809 | 7/1968 | Hunter | 210/415 X |

FOREIGN PATENTS OR APPLICATIONS

| | | | |
|---|---|---|---|
| 912,705 | 8/1946 | France | 210/415 |
| 603,025 | 9/1934 | Germany | 210/415 |

*Primary Examiner*—John Adee
*Attorney*—Janes & Chapman

[57] ABSTRACT

A process is provided for filtering cellulose fiber suspensions to separate from the fibers contaminant particles having large and small dimensions, such that they are capable if oriented with their small dimension in one direction of passing through the filter, but incapable of passing through the filter if oriented with their large dimension in such direction. The cellulose fiber suspension is caused to impinge upon a filter surface arranged in an angle within the range from about 2.5° to about 45° to the direction of flow of the fiber suspension, thus deflecting the flow, and forcing the particles to change direction before they can pass through the filter.

Apparatus also is provided for filtering such fiber suspensions, comprising a housing in which the filter surface is arranged at an angle within the range from about 2.5° to about 45° to the direction of flow of the fiber suspension through the housing from the inlet to the filtered fiber suspension outlet.

17 Claims, 3 Drawing Figures

PROCESS AND APPARATUS FOR FILTERING CELLULOSE FIBER SUSPENSIONS

Cellulose pulp fiber suspensions present a formidable cleaning problem since it is necessary to separate large and small dirt and contaminant particles from cellulose fibers. This means, of course, that such particles must be removed substantially without separation of the desirable pulp fibers, which must pass through the cleaner.

Two types of apparatus are in common use, centrifugal or cyclone separators, and filters. Filters are superior to the centrifugal or cyclone separators in the efficiency of their separation of large particles which are absolutely incapable of passing through the filter. However, filters are not generally capable of distinguishing between dirt particles which are capable of passing through the filter, even when oriented only with their small dimension in one direction, and the desired cellulose pulp fibers, which also pass through the filter. Here, their separation efficiency is very low indeed, and filters are in fact inferior to the centrifugal or cyclone separators in this respect. Slender impurities having a diameter such that they can pass through the filter, such as shives, splinters, and similar particles, cannot be separated efficiently from cellulose pulp fibers by the filters heretofore available.

In accordance with the instant invention, it has been determined that particles having large and small dimensions, which are capable of passing through the filter if oriented with their small dimension in one direction, such as heading into the filter pores, but not if oriented with their large dimension in that direction, can be separated from cellulose pulp fibers and other types of fibers in fiber suspensions, if they are made to impinge tangentially upon the filter surface. This ensures that the particles are oriented tangentially to the filter at the time that they strike it, and thus must change direction before they can pass through the filter openings. Such tangential impingement can be effected by an appropriate direction of fiber suspension flow towards the filter and/or by an appropriate arrangement of the filter surface with respect to fiber suspension flow so that the fiber suspension impinges upon the filter surface at an angle within the range from about 2.5° to about 45°, preferably from 15° to 30°, to the direction of fiber suspension flow.

When this is done, a portion of the flowing fiber suspension passes through the filter, and a portion is deflected, to flow along the surface of the filter. The deflected flow portion entrains the particles which otherwise might be capable of passing through the filter, prevents their turning to pass through the filter, and removes them from the filter surface. The filtered fiber suspension can be withdrawn in the usual way, and the deflected portion of unfiltered fiber suspension is also withdrawn separately, to aid in maintaining the deflected flow.

The process of the invention comprises impinging the flowing fiber suspension upon a filter surface at an angle within the range from about 2.5° to about 45°, preferably from 15° to 30°, to the direction of fiber suspension flow, so as to cause the particles to strike the filter tangentially, and head them along the filter surface rather than towards the filter openings, thus inhibiting their passage through the filter; drawing off filtered fiber suspension from the other side of the filter surface; and drawing off unfiltered fiber suspension containing the suspended particles which are incapable of passing through the filter after impingement upon the filter surface.

The apparatus of the invention for filtering such fiber suspensions to separate such particles comprises, in combination, a housing; disposed in the housing, an inlet for introduction of fiber suspension to be filtered, an outlet for withdrawal of filtered fiber suspension and an outlet for withdrawal of unfiltered fiber suspension containing separated particles; and a filter disposed in the housing across the line of fiber suspension flow between the inlet and the filtered fiber suspension outlet at an angle to such flow within the range from about 2.5° to about 45°, preferably from 15° to 30°, so that the particles are oriented to strike the filter tangentially, and inhibit their passage through the filter.

A preferred embodiment of apparatus includes a means for directing a wash flow of fiber suspension along the surface of the filter, so as to carry away the particles separated by the filter and prevent their turning to enter the filter openings, as well as obstruction and eventual blockage of the filter openings by such removed particles. In a particularly preferred embodiment of the invention, the filter is in the form of an annular dished plate, preferably having a plurality of such dished plates arranged in pairs, facing each other, and the means for directing a wash flow along the surface of the filter is a stirring means arranged to move in close proximity to and sweepingly along the plate surfaces.

Preferred embodiments of the invention are shown in the drawings, in which.

Figure 1:
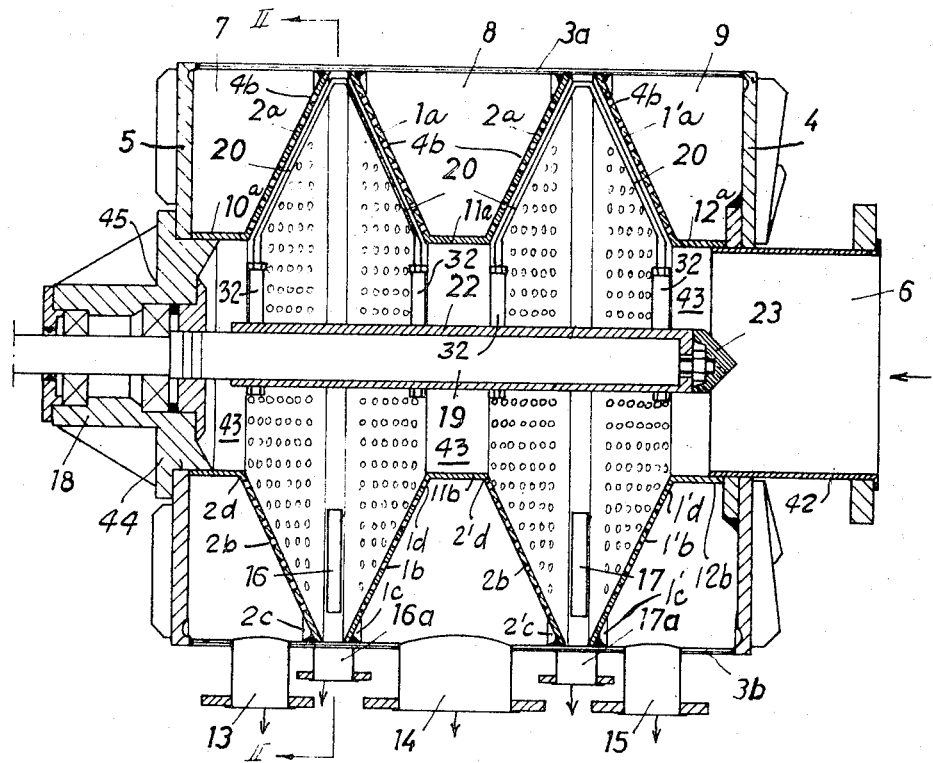
FIG. 1 shows in longitudinal section one embodiment of filtering apparatus of the invention.

It will be apparent from the above that the important feature of the instant invention, both in its process and apparatus embodiments, is the orientation of the filter surface at an angle to fiber suspension flow within the range from about 2.5° to about 45°. Since particles having both large and small dimensions generally tend to orient themselves in a fluid flow with the large dimension approximately parallel to the direction of flow, and their small dimension headed in the direction of flow, in accordance with known principles of fluid mechanics, this insures that the particles will strike the filter surface at an angle such that the small dimension cannot enter the pores or openings of the filter without the particles' changing direction.

Such a change in direction is made more difficult, however, by the fact that a portion of the flow is also deflected, to flow along the surface of the filter. Although some flow passes through the filter openings, and tends to draw particles with it, the particles that can only enter if properly oriented tend to be tumbled along the surface, and can hardly ever achieve the orientation necessary for passage.

On the other hand, fibers in suspension which are flexible are not affected, and can pass through the filter openings as usual. Such passage is facilitated by a relatively lower density, and/or a smaller diameter, as compared to contaminant particles. Factors improving separation of the contaminant particles are a lesser flexibility, a greater density, and a greater diameter in the smaller dimension, as compared to fibers that pass through the filter.

A further factor is the proportion and flow rate of deflected flow or wash flow. These can be controlled to ensure that even at the furthest periphery of the filter surface there is a sufficient wash flow to continue to entrain and carry the particles in suspension, and remove them from the filter surface.

In order to provide an adequate wash flow, a proportion of the unfiltered fiber suspension flow impinging upon the filter surface is withdrawn separately at the same time as the filtered fiber suspension flow is withdrawn. The relative proportions of filtered and unfiltered fiber suspension flow that are withdrawn determine the wash flow. This is selected at a proportion appropriate for the particular fiber suspension being filtered, and the filtering conditions. The determination is made by trial-and-error experimentation, which can be carried out by those skilled in the art in the usual manner, the proportion of unfiltered fiber suspension flow to filtered fiber suspension flow being selected so as to obtain a minimum or no particles to be separated in the filtered fiber suspension flow. Such a proportion can suitably be within the range from 10:1 to 1:10 (FFSF:UFFSF).

The filter apparatus of the invention can accept any type of filter, such as a perforated plate, made of metal or of plastic, or a wire or filament mesh screen, in which the wires or filaments are made of metal or of plastic. Rolled and/or sintered wire mesh screens can be employed, and are particularly effective in that the pore openings are fixed by the rolling and sintering. The size of the pore openings will depend upon the size and type of fibers in the fiber suspension, and the dimensions of the particles to be separated, and is in no way critical.

The filter can be in the form of a flat plate or sheet, arranged across the direction of fiber suspension flow at an angle within the range from about 2.5° to about 45°, preferably from 15° to 30°. A curved plate or sheet can also be used with the angle of the surface to flow varying from point to point, but being within the range at any given point. Both concavely and convexly curved surfaces are useful.

A preferred type of filter plate is an annular plate, in which the filter surface is dished or conical, or frustoconical, at an angle to fiber suspension flow within the stated range. It is important to note that the angle of the plate to the flow is always determined with respect to the direction of fiber suspension flow. In the case of an annular plate, the flow is usually directed from the center of the plate towards the periphery. The angle of a conical or frustoconical plate can also be determined with respect to the geometric axis of the filter plate, i.e., the cone angle, and corresponds to a cone angle within the range from about 90° to about 175°, preferably from 120° to 150°. The sides of such plates can be either straight or curved, such as convexly or concavely.

Figure 2:
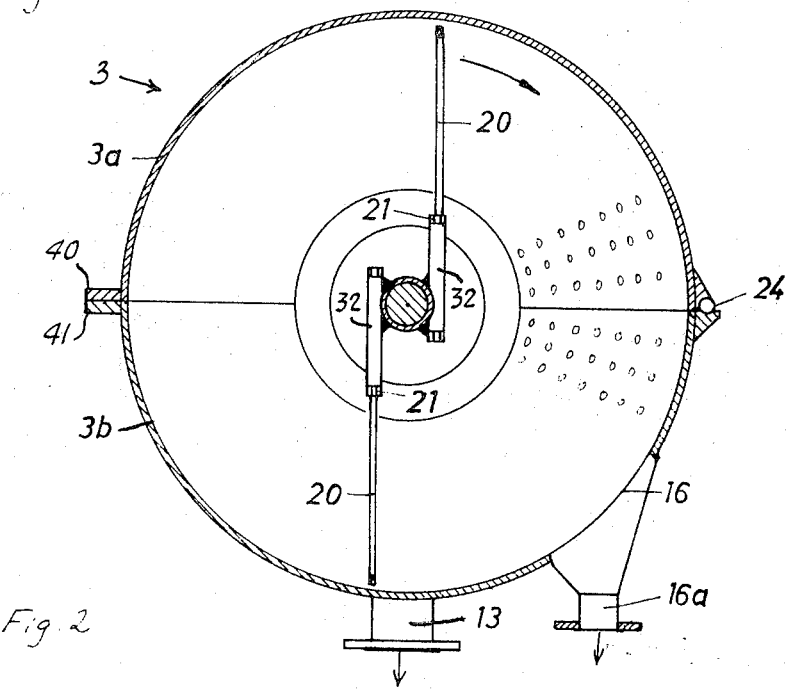
FIG. 2 is a sectional view of the filtering apparatus of FIG. 1, taken along the lines II—II of FIG. 1, and looking in the direction of the arrows.

The filter apparatus shown in FIGS. 1 and 2 has filter members in the form of four annular frustoconical perforated filter plates, arranged in two pairs, 1,2, 1',2', with their frusto-conical surfaces facing outwardly. Each plate of each pair is in two parts, $1a,1b$, $2a,2b$, $1'a,1'b$, $2'a,2'b$, and is attached at its outer periphery $1c,2c$, $1'c,2'c$, to the inside of an enclosing cylindrical casing or housing 3 which is in two parts, $3a,3b$. Each annular plate has a central opening $1d,2d$, $1'd,2'd$, and is attached at its periphery abutting the opening to one end of one of the three cylindrical sections 10, 11, 12, which are also in two parts, $10a,10b$, $11a,11b$, $12a,12b$. The central section 11 joins the inner edges of the two centrally disposed filter plates 1,2', situated closest to each other, while the outer sections 10, 12 join the inner edges of the outer plates 2,1'. The other end of the sections 10, 12 are attached to the end caps 4, 5, closing off the open ends of the casing 3.

It will be apparent from FIG. 2 that the two halves $3a,3b$ of the casing 3 are linked together at one side through a hinge 24, on which each half pivots, for separation of the halves, to gain access to the interior of the apparatus. The other side of each section $3a,3b$ is provided with a flange or lip 40, 41 which can be tightly sealed. Each of the a and b halves of the filter plates 1,2, 1',2' and the sections 10, 11, 12 are attached to the casing halves $3a,3b$, respectively, so that both halves open together.

Into the open end of the cylindrical section 12 is attached an inlet tube 42, through which fiber suspension to be filtered can be introduced into the open space or chamber 43 enclosed within the sections 10, 11 and 12, and the filter plate pairs 1,2, 1', 2'.

The outer side of cylindrical section 10, the inside of end cap 5, casing sections $3a,3b$, and the outer side of filter plate 2 define an annular chamber 7 for reception of filtered fluid passing through the plate 2. Similarly, the outer side of cylindrical section 11, the inside of casing sections $3a,3b$ and the outer side of filter plates 1,2' define a chamber 8, for reception of fluid passing through the plates 1,2'. The outer side of section 12, the inside of cap 4 and casing sections $3a,3b$, and the outer side of filter plate 1' define a chamber 9, for reception of filtered fluid passing through the plate 1.

Chamber 7 is provided with an outlet 13, chamber 8 with an outlet 14, and chamber 9 with an outlet 15, for withdrawal of filtered fluid. Chamber 43 is also provided with two outlets, 16a and 17a, between the pairs of filter plates 1,2 and 1',2', respectively, for removal of unfiltered fluid from the chamber 43. Access to the outlet 16a,17a is provided by the openings 16, 17 in the casing wall.

The end cap 5 has a central aperture 44 in which is supported an axle box 18, in which is rotatably mounted a shaft 19 provided with the necessary sealing means 45. The shaft is adapted to be rotated by a motor, which is not shown.

The shaft 19 serves as the support for two pairs of bow-shaped arms 20, which abut but do not touch the inner surfaces of filter plates 1,2, 1',2', and are rotated by the shaft 19. These inhibit the lodging of particles as well as creating a lateral rotating or circular flow of fluid at the pores or openings 46 of the filter plates, along the surfaces of the plates. The arms 20 are mounted in the tubes 32 by means of nuts 21, and are movable in and out of the tubes into any desired position with respect to the surfaces of the plates 1,2, 1',2' by means of the nuts. The tubes 32 are in turn mounted on the outside of a sleeve 22 over shaft 19, and the sleeve 22 is adjusted in the axial direction and fixedly held to the shaft 19 through a nipple 23 at the end of the shaft.

In operation, the fiber suspension to be filtered is introduced into the casing 3a,3b through the inlet 6, and enters the space 43 defined by the filtering plates 1,2, 1',2' and the cylindrical walls sections 10, 11 and 12. There, the originally axial flow direction is altered, to direct the fiber suspension radially towards the filter plates 1,2, 1'2', which are set at an angle of 30° to the radial flow, with the aid of the stirring device 19, 20. The main part of the fiber suspension to be filtered, including the fibers, passes through the holes 46 of the filter plates, into the filtered fluid collection chambers 7, 8 and 9, and is discharged from these through the outlets 13, 14 and 15. The portion of the unfiltered suspension not passing through the filter plates leaves the space 43 through the openings 16, 17 and the outlets 16 a, 17a, carrying with it the particles that do not pass through and thus are separated by the filter. By suitably adapting the sizes of the outlets 16a, 17a with respect to the outlets 13, 14 and 15, and the proportion and flow rate of the filtered and unfiltered fluid passing therethrough, respectively, the desired separation and concentration of the separated particles in the fraction not passing through the filter plates can be obtained. Due to the conical form of the filter plate pairs 1,2, 1',2', the diameter and thus the volume of the space 43 decreases outwardly, towards the periphery of the plate pairs, at the housing 3, so that a constant radial flow rate of unfiltered fluid flow can be maintained along the surface of the filter plates.

The proportion of unfiltered fiber suspension and filtered fiber suspension withdrawn through the outlets 16a, 17a, and 13, 14 and 15, respectively, is adjusted to provide a sufficient wash flow along the surfaces of the filters 1,2, 1',2' to ensure substantially complete removal of particles having both large and small dimensions, and capable of entering the filter openings 46 when headed into the openings at the small dimension.

The angle of the filter plates 1,2, 1',2' towards the direction of fluid flow, as shown in FIGS. 1 and 2, i.e., along the radial axis of each filter plate pair 1,2, 1',2', is 30°. This angle, however, can be varied as desired within the range from 2.5° to 45°, corresponding to a cone angle from 90° to 175° and preferably between 15° and 30°, corresponding to a cone angle of 120° to 150°. The plates shown are flat, but they can also be curved, either concavely or convexly, as desired.

Instead of providing separate outlets 13, 14 and 15 for filtered fluid, and 16a, 17a for unfiltered fluid, it is possible to connect the chambers 7, 8 and 9 so that a single outlet will serve, and the same can also be done for outlets 16a, 17a, so that a single outlet is fed by the two openings 16, 17.

Figure 3:
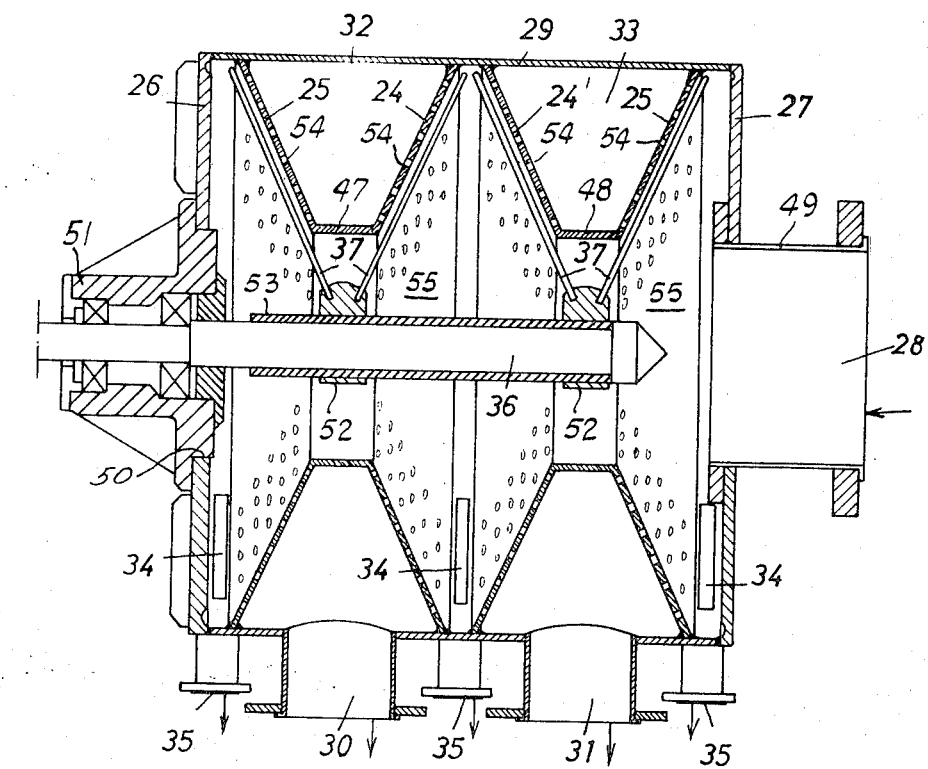
FIG. 3 is a view in longitudinal section of another embodiment of filtering apparatus in accordance with the invention.

The apparatus shown in FIG. 3 is quite similar to that shown in FIGS. 1 and 2, but the frustoconical filter plates are arranged with the dished sides extending towards each other (inwardly, instead of outwardly) in pairs. In this case, there are two pairs of annular dished filter plates 24,25, 24',25'. The central filter plates 24, 24' are arranged with their concave sides facing each other, as in FIGS. 1 and 2, and the outer plates 25, 25' are arranged with their concave sides facing the end caps 26, 27 of the cylindrical housing 29. The filter plates 24, 25, 24', 25' are attached at their outer periphery to the casing 29, and at their inner periphery the plates are attached to cylindrical sections 47, 48. The casing, plates and cylindrical sections are in matching halves, as in the apparatus of FIGS. 1 and 2.

The end cap 27 has a central opening, in which is fixed an inlet tube 49, serving as the fluid inlet 28. The end cap 26 has a central aperture 50, and an axle box 51 is fixed in the aperture, with shaft 36 rotatably mounted therein. Supporting rings 52 are fixedly mounted on the sleeve 53, which in turn is fixed on the shaft 36. The rings 52 support two pairs of arms 37, which extend towards the outer periphery of the filter plates 24, 25, 24', 25', in closely abutting relationship to the surfaces thereof. Rotation of the shaft 36 rotates the arms 37, inhibiting the lodging of particles in the filter openings 54, and also creating a fluid flow along the surface of the plates in a rotating or circular direction.

The outer side of cylindrical section 47, inside of the casing 29, and outer side of the filter plates 24, 25 define a chamber 32 for filtered fluid passing through the filter plates 24, 25. Similarly, the outer side of cylindrical section 48, inside of the casing 29, and the outer side of the filter plates 24', 25' define a chamber 33 for collection of filtered fluid passing through the filter plates 24', 25'. The chamber 32 is provided with an outlet 30, and chamber 33 with an outlet 31, for withdrawal of filtered fluid from the casing.

The inlet 28 opens into the space 55 within the cylindrical casing sections 47, 48 and the filters 24, 25, 24', 25'. Three outlet openings 34 provide access to the three outlets 35, for withdrawal of unfiltered fluid from the space 55.

The cone angle of the filter plates 24, 25, 24', 25' as shown in FIG. 3 is 150°, corresponding to an angle to the direction of flow of 30°, but the plates can be arranged at any cone angle within the range from about 90° to about 175°, and preferably at an angle between 120° and 150°, corresponding to angles to the direction of flow of from 2.5° to 45°, preferably from 15° to 30°.

In operation, unfiltered fiber suspension is introduced through the inlet 28, and passes into the space 55, where it is directed towards the surfaces of the filter plates 24, 25, 24', 25' by the stirrer 36, 37. Fiber suspension passing through the openings 54 of the filter plates enters the chambers 32, 33, and the filtered suspension is withdrawn through the outlets 30, 31, respectively. Unfiltered fiber suspension that does not pass through the filter plates flows along the surfaces of the filter plates, and is withdrawn from the space 55 via the outlet openings 34, 35. The proportion of unfiltered fiber suspension and filtered fiber suspension withdrawn through the outlets 35 and outlets 30, 31, respectively, is adjusted to provide a sufficient wash flow along the surfaces of the filters 24, 25, 24', 25' to ensure substantially complete removal of particles having both large and small dimensions, and capable of entering the openings 54 of the filter when headed into the openings at the small dimension.

In this apparatus, also, the outlets 30, 31 can be interconnected, and the three outlets 35 can also be be interconnected as a single outlet, to which access is provided through the openings 34.

It will, of course, be understood that while the orientation of the device as shown in FIGS. 1, 2 and 3 is horizontal, it can also be vertical, or at any desired angle, since this is not a critical factor in operation.

The process and apparatus of the invention are applicable to fiber suspensions of all types, and especially to aqueous suspensions of cellulose pulp fibers obtained by any cellulose fiber-liberating process, such as by chemical, semi-chemical or mechanical cellulose-disintegrating processes. The fiber suspension can be in water or in an organic solvent, and the fibers can be of natural origin, or derived from natural materials or fibers, or of synthetic fibrous material, such as wool, jute, silk, cotton, acetate, rayon, viscose rayon, wood pulp, vegetable fibers, bagasse, ramie, linen, nylon, polypropylene, polyacrylonitrile, polyesters, and polyvinyl chloride. The fibers should be flexible, and relatively short, but they need not be shorter than the contaminant particles to be removed.

The contaminant particles, in the case of cellulose pulp fibers, are incompletely broken-down cellulose or wood particles, particularly long or flat particles such as shives, as well as particles of resin, bark, and other particulate materials. Such particles are usually stiff or relatively inflexible, as compared to the fibers.

Having regard to the foregoing disclosure, the following is claimed as the inventive and patentable embodiments thereof:

1. A process for filtering fiber suspensions to separate fibers capable of passing through a filter from particles having large and small dimensions, such that they are capable if oriented with their small dimension headed towards the filter of passing through the filter, but incapable of passing through the filter if oriented with their large dimension headed towards the filter, which comprises impinging substantially all of a flowing liquid fiber suspension including fibers and such particles upon one side of a stationary filter surface at an angle within the range from about 2.5° to about 45° to the direction of fiber suspension flow, so as to cause substantially all of such particles to strike the filter with their large dimension headed towards the filter and deflect such particles with their large dimension facing the filter together with a portion of the flow along the filter surface, while the fibers and a portion of the flow pass through the filter; drawing off filtered fiber suspension from the other side of the filter surface; and drawing off unfiltered fiber suspension containing suspended such particles from the same side of the filter surface after flow along the filter surface.

2. A process in accordance with claim 1, which comprises directing a wash flow of fiber suspension along the filter surface to inhibit particles separated by the filter from lodging on the surface of the filter.

3. A process in accordance with claim 2, in which the filter surface is in the form of an annulus, and the fiber suspension flow is directed towards the filter surface to impinge thereon at such angle.

4. A process in accordance with claim 1, which comprises adjusting the relative flows of filtered fiber suspension and unfiltered fiber suspension withdrawn from each side of the filter to control the wash flow of fiber suspension along the filter surface.

5. A process in accordance with claim 1, in which the impingement is at an angle within the range from about 15° to about 30°.

6. A process in accordance with claim 1, in which the filter surfaces are arranged annularly about a central axis, and the fluid flow is caused to flow radially outwardly from the central axis towards the filter surfaces.

7. Apparatus for filtering liquid fiber suspensions to separate fibers capable of passing through a filter from particles having large and small dimensions such that they are capable if oriented with their small dimension headed towards a filter of passing through the filter, but incapable of passing through the filter if oriented with their large dimension headed towards the filter, comprising, in combination, a housing, and, disposed therein, an inlet for introduction of fiber suspension to be filtered along a horizontal axis of the apparatus, an outlet for withdrawal of filtered fiber suspension, and an outlet for withdrawal of unfiltered fiber suspension containing separated particles; a stationary annular filter plate in which the filter surface extends radially from and about the horizontal axis and is disposed in the housing across the line of fiber suspension flow between the inlet and the filtered fiber suspension outlet at an angle within the range from about 2.5° to about 45°; stirring means adjacent the filter surface and rotatable about the horizontal axis, so as to redirect outwardly with respect to the horizontal axis such axial flow of fluid through the inlet towards the annular filter plate, and cause substantially all of the fiber suspension to impinge upon one side of the filter surface at an angle within said range, so as to cause substantially all of such particles having large and small dimension to strike the filter with their large dimension headed towards the filter and deflect such particles with their large dimension facing the filter together with a portion of the flow along the filter surface, while the fibers and a portion of the flow pass through the filter; means for drawing off filtered fiber suspension from the other side of the filter surface; and means for drawing off unfiltered fiber suspension containing suspended such particles from the same side of the filter surface after flow along the filter surface.

8. An apparatus in accordance with claim 7, including means for directing a wash flow along the filter surface.

9. Apparatus in accordance with claim 7, in which the annular filter plate is dished.

10. Apparatus in accordance with claim 9, having a plurality of annular dished plates arranged in pairs, with alternate dished plates facing in opposite directions.

11. Apparatus in accordance with claim 7, including means for controlling the relative proportions of unfiltered fiber suspension and filtered fiber suspension withdrawn through their respective outlets.

12. Apparatus in accordance with claim 7, comprising the stirring means is arranged to move along the filter surface and in close proximity thereto.

13. Apparatus in accordance with claim 12, in which the filters are in the form of annular dished plates and the stirring means is arranged to rotate along the filter plate surfaces.

14. Apparatus in accordance with claim 7, in which the filter plates are arranged at an angle within the range from about 15° to about 30°.

15. Apparatus in accordance with claim 7, in which the filter plates are in the form of perforated plates.

16. Apparatus in accordance with claim 7, having a plurality of filter plates which are arranged in halves, attached at their outer periphery to corresponding housing halves, and are joined together at their inner periphery to corresponding cylindrical section halves arranged axially, with the inlet for unfiltered fiber suspension connected with the interior of the cylindrical sections, and the cylindrical sections, filter plates and housing defining chambers therebetween for reception of filtered fluid, with the outlet for filtered fiber suspension connected with such chambers, and with the outlet for unfiltered fiber suspension connected with the interior of the cylindrical sections.

17. Apparatus in accordance with claim 16, in which the filter plates are dished, and are arranged in pairs, with alternate dished plates facing in opposite directions.

* * * * *